United States Patent [19]
Ormond

[11] 4,150,729
[45] Apr. 24, 1979

[54] STRAIN GAUGE FLEXURE ISOLATED WEIGHING SCALE

[76] Inventor: A. Newman Ormond, 11969 E. Rivera Rd., Santa Fe Springs, Calif. 90670

[21] Appl. No.: 904,239

[22] Filed: May 9, 1978

[51] Int. Cl.$^2$ .......................... G01G 3/14; G01G 3/08
[52] U.S. Cl. ...................................... 177/211; 177/229
[58] Field of Search .............. 177/211, 229; 73/141 A

[56] References Cited

U.S. PATENT DOCUMENTS

| | | | |
|---|---|---|---|
| 3,439,761 | 4/1969 | Laimins | 177/211 |
| 3,554,026 | 1/1971 | Seed | 177/211 X |
| 3,805,604 | 4/1974 | Ormond | 177/211 X |
| 3,994,161 | 11/1976 | Trozera | 177/211 X |
| 4,009,608 | 3/1977 | Ormond | 73/141 A |
| 4,020,686 | 5/1977 | Brendel | 177/211 X |
| 4,065,962 | 1/1978 | Shoberg | 73/141 A |

*Primary Examiner*—George H. Miller, Jr.
*Attorney, Agent, or Firm*—Ralph B. Pastoriza

[57] ABSTRACT

The scale includes a horizontal load plate and base plate supported in spaced parallel relationship by first and second generally rectangular load members lying in vertical spaced planes extending between the corners of the load plate and base plate. Opposite end portions of each rectangular load member are symmetrical about a vertical axis passing midway therethrough, these opposite end portions defining corner flexure supports connected between central body portions of the rectangular load members and end posts. The end posts connect to the load plate and the bottom of the central body portions of the members rest on the base plate. Each corner flexure support means includes specially designed flexure webs which will flex under a load on the base plate. Strain gauges attached to certain ones of the flexure webs provide electrical read-out signals constituting a function of a force applied to the load plate. The overall design of each of the corner flexure support means is such that the strain gauges are isolated from extraneous strains resulting from off-center application of a force on the load plate. Different electrical bridge configurations may be used for providing the read-out signal from the strain gauges.

16 Claims, 12 Drawing Figures

STRAIN GAUGE FLEXURE ISOLATED WEIGHING SCALE

This invention relates broadly to load elements carrying strain gauges and more particularly to a strain gauge flexure isolated weighing scale in which appropriate flexure support means are provided to isolate extraneous strains from strain gauges secured to certain ones of the flexure webs.

BACKGROUND OF THE INVENTION

It is common practice to utilize load cells for force measuring operations. Normally, the load cells may take the form of columns, shear plates or flexure webs having strain gauges affixed in a manner to provide an output signal indicative of a load applied to the load cell. In utilizing the load cell to measure a load or force, one or more cells are connected in a structure designed with suitable flexure supports such that only desired components or forces to be measured will be transmitted to the strain gauges on the load cells.

In my copending U.S. patent application Ser. No. 821,631 filed Aug. 4, 1977 and entitled LOAD CELLS FOR FLEXURE ISOLATED ELECTRONIC SCALE there is disclosed a horizontal load plate and base plate supported in spaced parallel relationship by first and second generally rectangular load members lying in vertical spaced planes extending between the corners of the load plate and base plate. Opposite end portions of each of the rectangular members define a corner flexure support means between the opposed corners of the load plate and base plate, these corner flexure support means being so designed that the signal output from strain gauges incorporated therein will be consistent for any particular point of application of a force on the load plate; that is, off-center loading will not affect the readings.

While the foregoing described structure operates well, there is room for additional improvement particularly with the end in view of simplifying the corner flexure support means without sacrifice of linearity between the read-out signal and applied load. It would also be desirable to provide a structural design which lends itself readily to sensitivity adjustment by mechanical means such as disclosed and described in my U.S. Pat. No. 3,968,676 entitled MECHANICAL EQUALIZATION OF STRAIN GAUGE SENSITIVITY.

BRIEF DESCRIPTION OF THE PRESENT INVENTION

With the foregoing in mind, the present invention contemplates the provision of a strain gauge flexure isolated weighing scale generally similar in construction to that described in my above-referred to copending patent application but incorporating improvements therein which result not only in a simplification of the flexure web configuration but increased accuracy in the read-out. Moreover, the new configuration of this invention provides a structure wherein the sensitivity of each corner flexure support means can be easily mechanically adjusted by a simple filing operation. In this latter respect, the particular load element or flexure web to which a strain gauge is secured can be approximately filed to change its cross sectional area without removing or in any way damaging the strain gauge itself as opposed to prior art structures wherein a direct material removal operation on a load element would be difficult.

Briefly, in its broadest aspect, the present invention comprises an integral load member having an end portion for receiving a load and a central body portion secured in a stationary position with a flexure support means integrally connecting the central body portion to the end portion. The flexure support means itself includes first, second, third and fourth horizontal flexure webs disposed one below the other in vertically spaced relationship having first ends integrally secured to the central body portion and second ends extending towards the end portion the end portion itself including vertical flexure web means having upper and lower opposite ends between at least two of the extending second ends of the horizontal flexure webs. Strain gauge means are secured to at least one surface portion of at least one of the second and third horizontal flexure webs, the opposite surfaces of each of these webs being free of strain gauges and readily exposed for mechanical removal of material to effect the desired heretofore mentioned sensitivity adjustments.

In the preferred embodiment, the integral load member is in the form of a rectangular load member, the end portion opposite the first mentioned end portion incorporating a flexure support means such that symmetry is provided about a vertical axis passing midway through the central body of the rectangular member. Two of these members are provided in vertical spaced planes extending between a load plate and a base plate to provide an overall weighing scale in which the output signal is independent of extraneous strains or force moments resulting from off-center loading.

BRIEF DESCRIPTION OF THE DRAWINGS

A better understanding of this invention as well as further features and advantages thereof will be had by now referring to the accompanying drawings in which.

DETAILED DESCRIPTION OF THE PREFERRED EMBODIMENT

Figure 1:
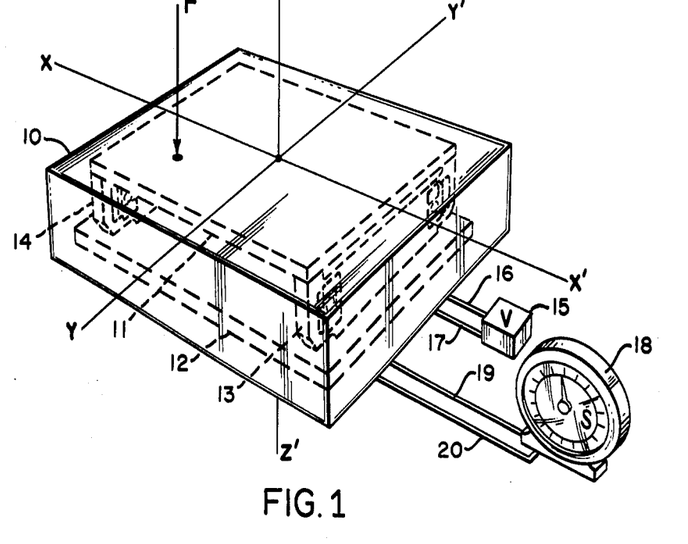
FIG. 1 is an overall schematic perspective view of the strain gauge flexure isolated weighing scale of this invention.

Referring first to FIG. 1, the strain gauge flexure isolated weighing scale includes a cover 10 resting on top of a horizontal load plate shown in phantom lines at 11. A horizontal base plate similarly shown in phantom lines at 12 is disposed beneath the load plate in spaced parallel relationship.

First and second generally rectangular load members also shown in phantom lines at 13 and 14 include central body portions lying in spaced vertical planes extending between the load plate 11 and base plate 12.

Shown to the right of FIG. 1 is a block 15 schematically designating an electrical source V connected by appropriate power leads 16 and 17 to various strain gauges incorporated in the first and second rectangular load members 13 and 14. Also schematically illustrated at S is a read-out indicating means 18 connected by appropriate signal leads 19 and 20 passing from appropriate circuits incorporating the strain gauges in the rectangular load members.

Figure 2:
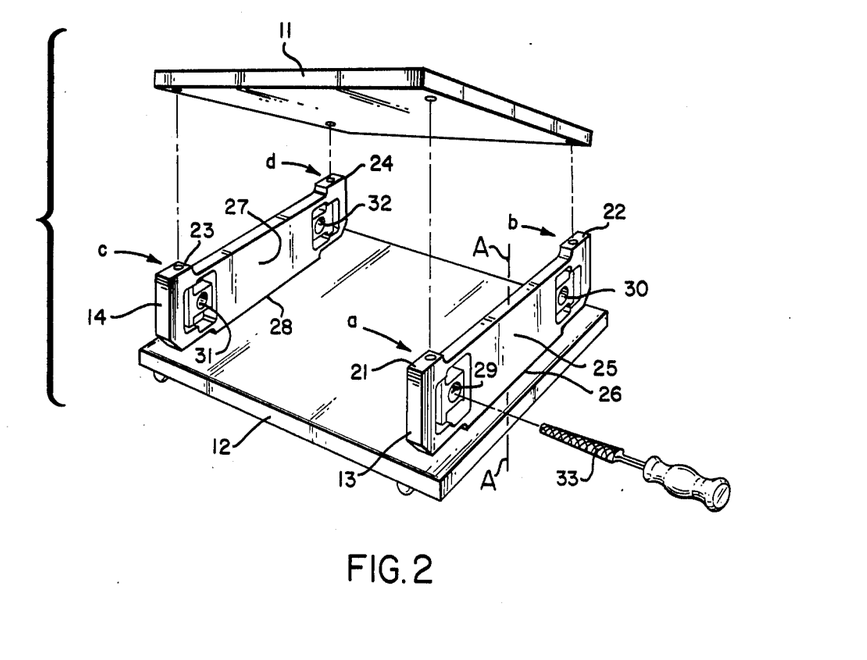
FIG. 2 is an exploded perspective view of the scale shown in FIG. 1 with the cover removed.

Referring now to FIG. 2, further details of the structure described will be evident. As shown, the opposite end portions of each rectangular load member 13 and 14 are symmetrical about a vertical axis A—A passing midway through the central body portion of the member. These opposite end portions define corner flexure support means designated generally by the letters a, b, c and d. These corner flexure support means include corner posts 21, 22, 23 and 24 respectively connected to the vertically opposed corners of the load plate 11 when the same is assembled on top of the members. The central body portion of the rectangular member 13 is shown at 25 and has its central bottom portion 26 resting or secured to the base plate 12. Similarly, the central body portion 27 of the rectangular member 14 has its central bottom portion resting or secured on the base plate 12 as at 28.

As will be described in further detail, each of the corner flexure support means includes a circular cut-out such as indicated at 29, 30, 31 and 32 for the four corners a, b, c and d defining portions of flexure webs to which strain gauges are secured in each of these corners.

Shown exploded to the right of the structure of FIG. 2 is a file 33 which may be provided with the conventional semi-cylindrical file configuration. The circular cut-outs will receive the file 33 so that manual filing of the strain gauge flexure webs can take place.

Figure 3:
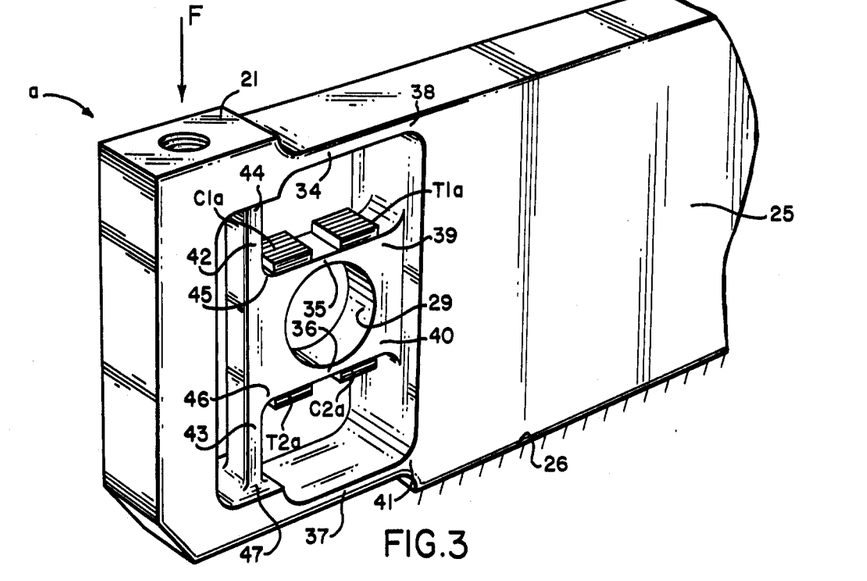
FIG. 3 is a greatly enlarged fragmentary perspective view of a corner portion of one of the rectangular load members constituting one component of the scale of FIGS. 1 and 2.

The foregoing will be better understood by now referring to the enlarged fragmentary perspective view of FIG. 3 which illustrates the corner flexure support means a in greater detail. Since the remaining corner flexure support means b, c and d are identical in configuration, a detailed description of the structure a will suffice for all.

In FIG. 3 the same numerals are used designating the corresponding portions described in FIG. 2. Thus the corner post connecting to the opposed corner of the load plate 11 described in FIG. 2 is shown at 21 while the central bottom 26 of the central body portion 25 is schematically indicated as anchored to a stationary structure which constitutes the base plate 12 of FIG. 2.

The corner flexure support means a itself comprises essentially first, second, third and fourth horizontal flexure webs 34, 35, 36 and 37 respectively disposed one below the other in vertically spaced relationship. These flexure webs have first ends integrally secured to the central body portion 25 as indicated at 38, 39, 40 and 41 respectively. The horizontal flexure webs extend towards the adjacent corner post 21, this corner post including vertical flexure web means comprised of first and second coplanar vertical flexure webs 42 and 43. The extending second ends of the horizontal flexure webs are indicated at 44, 45, 46 and 47, the second ends 44 and 45 of the first and second horizontal flexure webs 34 and 35 connecting to opposite ends of the first vertical flexure web 42 while the second ends 46 and 47 of the third and fourth horizontal flexure webs 36 and 37 connect to opposite ends of the second vertical flexure web 43.

In some instances, the vertical flexure web means need only comprise one or the other of the vertical flexure webs 42 and 43. In this latter instance, the vertical flexure web means would connect to at least two of the second ends of the first and second flexure webs or third and fourth flexure webs, the remaining second ends simply integrally terminating at the post 21.

Still referring to FIG. 3, there are illustrated strain gauge means T1a, C1a and C2a, T2a secured to upper and lower surface portions of the second and third horizontal flexure webs 35 and 36 respectively. In certain embodiments, there need only be provided the strain gauge T1a alone or with gauge C2a. In the preferred embodiment, each of the corner flexure support means, however, will incorporate four strain gauges as described, the T1a and T2a strain gauges constituting tension strain gauges and the C1a and C2a strain gauges constituting compression strain gauges.

The circular cut-out 29 shown in FIG. 3 and referred to briefly in FIG. 2 defines the lower surface of the second flexure web 35 and the upper surface of the third flexure web 36. The significance of this circular configuration will become clearer as the description proceeds.

Figure 4:
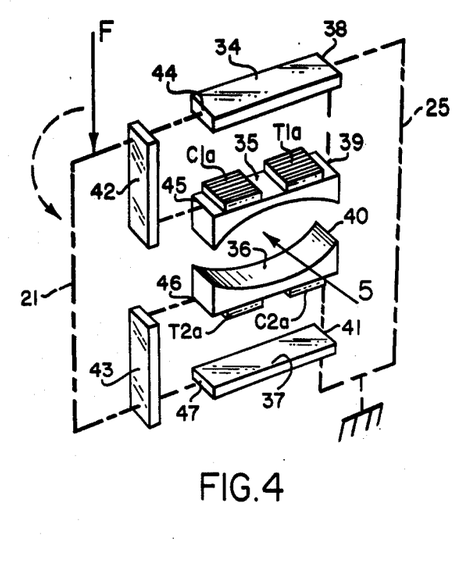
FIG. 4 is a highly schematic diagram useful in explaining the positioning and functioning of various flexure webs shown in the view of FIG. 3.

In the schematic diagram of FIG. 4, the various referred to horizontal flexure webs and vertical flexure webs are more clearly evident together with the referred to first and second ends. Identical numerals have been used in FIG. 4 to designate the corresponding portions described in the physical embodiment of FIG. 3. The central body portion 25 connecting to the base plate at 26 and the corner post 21 connecting to the load plate are depicted by the heavy dashed dot lines.

In FIG. 4, a force applied to the load plate will be applied to the post 21 as indicated by the vertical arrow F. This force will tend to move the post downwardly with respect to the central body portion 25 which is held stationary or anchored to the base plate. The vertical downward movement of the post 21 resulting from force F relative to the central body portion 25 will result in tension and compression strains developed in the second and third horizontal flexure webs 35 and 36 which in turn will be detected by the strain gauges to provide electrical signals constituting a function of the force.

The first and fourth horizontal flexure webs 34 and 37 essentially function to constrain movements of the corner post 21 relative to the central body portion 25 to a vertical rectilinear direction to isolate extraneous shear forces from the second and third horizontal flexure webs. The vertical flexure webs 42 and 43 in turn isolate bending moments indicated by the dashed curved arrow between the remaining portion of the corner post 21 and the central body portion 25 of the rectangular member. The strain gauges are thus responsive only to the total vertical axial loading on the corner post by the applied force F.

Figure 5:
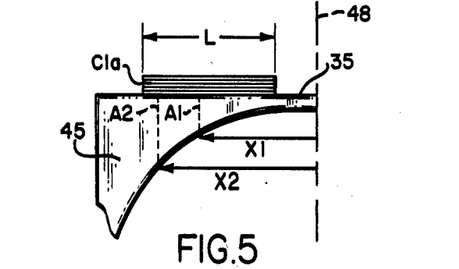
FIG. 5 is an enlarged fragmentary view of a portion of a flexure web looking in the direction of the arrow 5 of FIG. 4.

Referring now to the fragmentary view of FIG. 5, there is illustrated a portion of the second horizontal flexure web 35 from a mid point of the flexure web initiating at the vertical dashed line 48 to its second end 45. It will be noted that the circular cut out configuration results in a progressive increase of the cross sectional area of the flexure web from its mid point towards its second end 45. Thus, at a distance x1 from the mid point the cross sectional area is shown at A1 whereas at an increased distance x2 the cross sectional area increases to A2. This increasing cross sectional area with increasing distance from the mid-point towards an end of the flexure extends over a length L of the web surface covered by the strain gauge such as the strain gauge C1a shown in FIG. 5. Essentially, the varying cross section over the length of the strain gauge assures that the strain detected by each strain gauge is substantially constant over its length; that is the length of the web surface covered by the strain gauge.

With respect to the foregoing, the strain is proportional to the force moment which in turn is a function of the distance x. This same strain is also inversely proportional to the moment of inertia. By increasing the cross sectional area, this moment of inertia is made approximately proportional to the linear measurement x and thus the "x" terms in the strain equation cancel so that whatever strain developes in the flexure web surface portion covered by the strain gauge, is fairly consistent over the length of the gauge.

Figure 6:
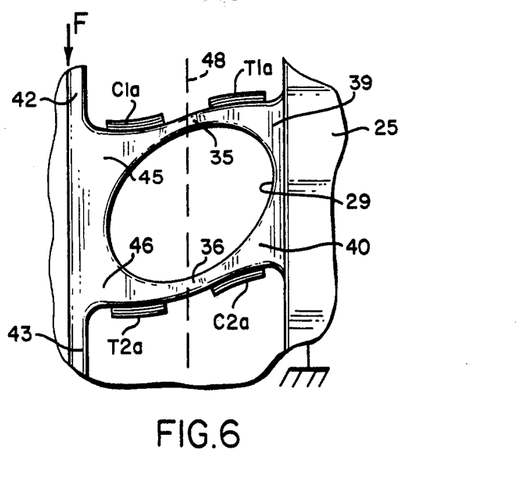
FIG. 6 is a fragmentary front elevational view of a portion of a flexure support means showing a distortion thereof in greatly exaggerated form.

It will be recalled that the strain gauges T1a and T2a were described as tension strain gauges while the strain gauges C1a and C2a were described as compression strain gauges. That these strain gauges measure respectively tension and compression will be evident by referring now to the greatly exaggerated distorted view of FIG. 6 indicating the manner in which the second and third flexure webs 35 and 36 will distort under a heavy force F. With the positioning of the strain gauges as illustrated in FIG. 6, it will become immediately evident that the strain gauges T1a and T2a are subject to tension while the strain gauges C1a and C2a are subject to compression.

Figure 7:
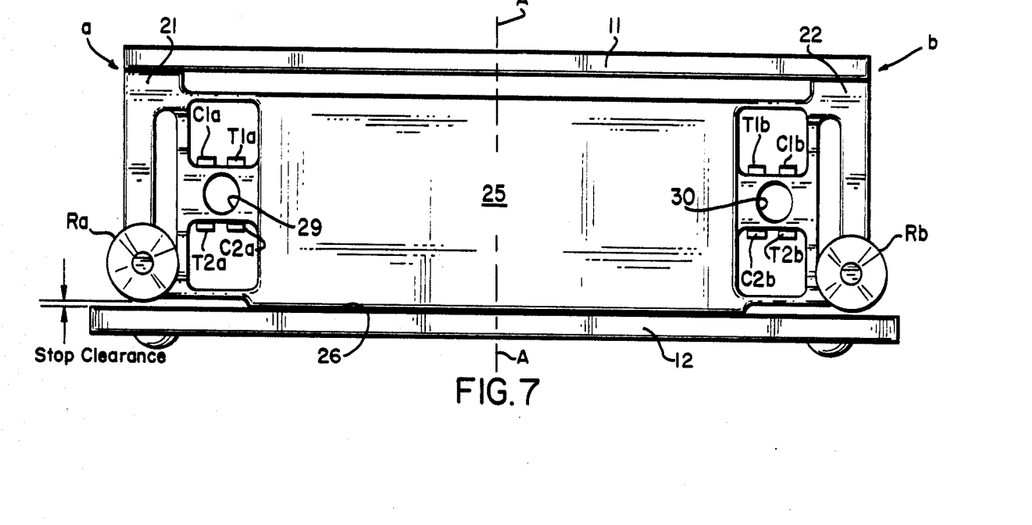
FIG. 7 is a full front elevational view of the assembled scale showing one type of overload stop means.

Referring now to FIG. 7, there is shown the opposite corner flexure support means designated generally by the letter b for the rectangular load member described in FIG. 3. It will be noted that for the second and third horizontal flexure webs corresponding to those described with respect to the corner flexure support means a are provided with strain gauges on their upper and lower surfaces respectively, symmetrically disposed with respect to the strain gauges on the corner flexure support means a. These opposite corner strain gauges are designated by the letters T and C followed by numerals 1 and 2 and the letter b indicating that they are associated with the opposite corner flexure support means b.

Similarly, the strain gauges associated with a corner flexure support means c and d shown in FIG. 2 are designated by appropriate letters T and C followed by numerals 1 and 2 and the corresponding letter c or d. The symmetry about the vertical axis A—A of the corner flexure support means is clearly evident in FIG. 7 and it will be understood that a corresponding symmetry exists for the rectangular load member 14 of FIG. 2.

FIG. 7 shows frictionally and eccentrically mounted overload stop rollers Ra and Rb which can be individually rotated to define a desired clearance with the base plate 12 and thus limit the deflection to such clearance. Similar rollers are provided on the rectangular member 27 of FIG. 2 but are omitted in this FIGURE and the other FIGURES to avoid obscuring the drawings. The eccentricity of the mounting of the rollers about their central shafts need only be very slight in order to provide an appropriate adjustable means for the stop clearance.

Figure 8:
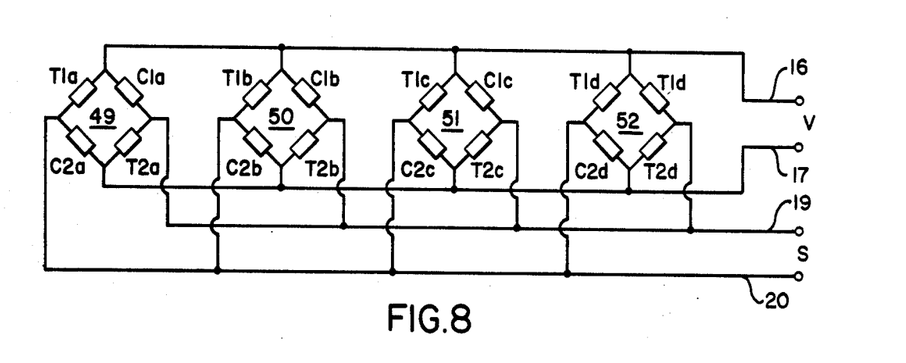
FIG. 8 is a first electrical circuit diagram showing the manner in which strain gauges in the scale may be incorporated in appropriate bridge circuits for providing an output signal.

Referring now to FIG. 8, there is indicated an electrical bridge network comprised of four electrical bridges 49, 50, 51 and 52. These four bridge circuits have two of their diagonally opposite vertices connected in parallel with the electrical source V by power leads 16 and 17 described in FIG. 1. The other two diagonally opposite vertices of each of the bridges in FIG. 8 in turn are connected in parallel with the signal indicating means S by way of the signal leads 19 and 20.

As shown in the left portion of FIG. 8, opposite arms of the first bridge 49 contain the tension strain gauges T1a and T2a in the corner flexure support means a shown in FIG. 7 and compression strain gauges C1a and C2a in the other opposite arms. Electrical bridge 50 incorporates the tension strain gauges T1b and T2b and the compression strain gauges C1b and C2b in a similar arrangement for the corner b and the remaining bridge circuits 51 and 52 incorporate the tension and compression strain gauges in the corners c and d described in FIG. 2. The reading on the signal indicating device S will be the average of the signal outputs from each of the individual bridges.

As mentioned briefly heretofore, it is possible to provide two strain gauges at each of the corner flexure support means such as a tension strain gauge T1a and a compression strain gauge C2a. In this event, only two electrical bridges are required as illustrated in FIG. 9.

Figure 9:
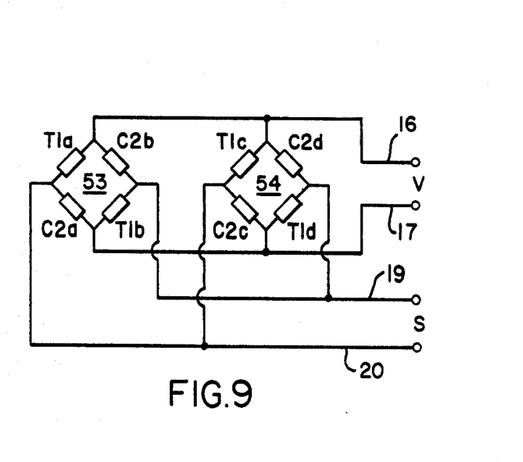
FIGS. 9, 10, 11 and 12 are schematic electrical diagrams of other possible bridge circuit configurations.

Referring specifically to FIG. 9, the first of these two bridges designated 53 would incorporate the tension strain gauge T1a in one corner flexure support means and in the opposite arm the tension gauge T1b in the opposite corner flexure support means of one of the rectangular members. The other opposite arms would incorporate the corresponding compression gauges C2a and C2b in these opposite corners. Thus the one electrical bridge 53 would incorporate the strain gauges associated with one of the rectangular members.

The second electrical bridge 54 incorporates the tension and compression strain gauges associated with the opposite corners of the second rectangular member and again the opposite vertices of the bridge are connected in parallel with the power leads 16 and 17 and the signal is taken off the other opposite vertices on signal leads 19 and 20. An advantage of the circuit of FIG. 9 is that the entire weighing scale only requires eight strain gauges as opposed to the sixteen strain gauges described in FIG. 8.

Figure 10:
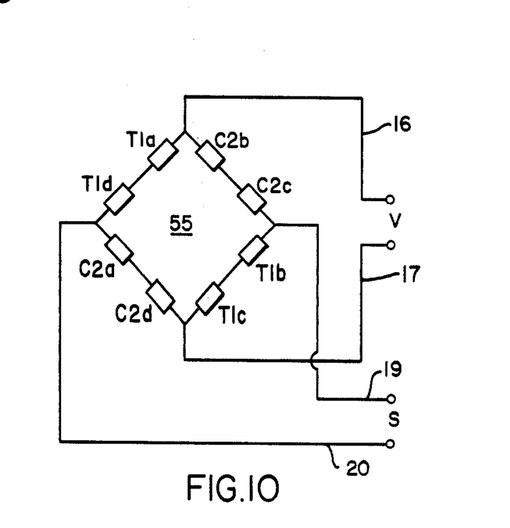

A third configuration shown in FIG. 10 is possible wherein only eight of the strain gauges are employed as described in conjunction with FIG. 9.

In this configuration, there is provided only a single electrical bridge 55 wherein two tension strain gauges from two corner flexure support means are connected in series in one arm and the remaining tension strain gauges in the other corner support flexure means are connected in series in the opposite arm. The remaining opposite arms incorporate the compression strain gauges as indicated. Again, the opposite vertices of this bridge connect to the power leads 16 and 17 and the other opposite vertices connect to the signal leads 19 and 20.

Figure 11:
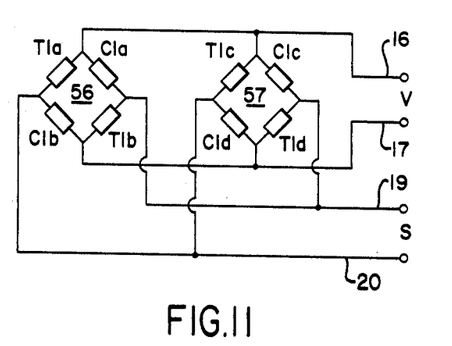

FIG. 11 shows a configuration of two bridges similar to FIG. 9 but wherein only the tension and compression strain gauges on the upper surface of the second flexure web in each corner are used, as opposed to one gauge on the second flexure and one gauge on the third flexure as in FIG. 9.

Thus, with reference to FIG. 7 and FIG. 11 together, bridge 56 includes gauges T1a from corner a and T1b from corner b in opposite arms and C1a from corner a and C1b from corner b in the other opposite arms. Bridge 57 includes gauges T1c from corner c and T1d from corner d in opposite arms and gauges C1c from corner c and C1d from corner d in the other opposite arms. As in the case of the bridge of FIG. 9, bridge 56 incorporates the strain gauges associated with one of the rectangular load members and bridge 57 incorporates the strain gauges associated with the other rectangular load member.

Figure 12:
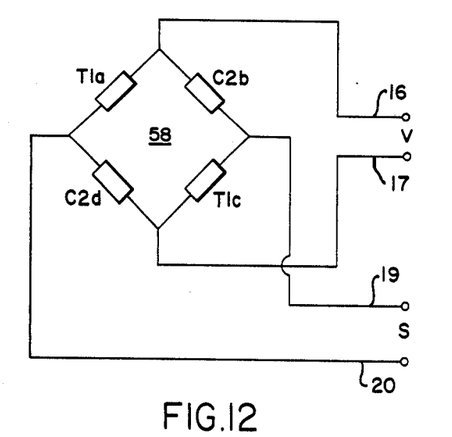

Finally, there is shown in FIG. 12 a single bridge 58 having only four strain gauges taken respectively from the corners a, b, c and d. Thus, only the strain gauge T1a from corner a and T1c from corner c are in opposite arms and only the strain gauges C2b from corner b and C2d from corner d are in the opposite arms. All other strain gauges could be eliminated to thereby reduce costs. This last circuit would represent the minimum number of gauges that could be used to provide a signal from each of the corner flexure support means.

Any one of the foregoing described electrical bridge networks might be utilized, the preferred network being that shown in FIG. 8 utilizing four bridges for sixteen strain gauges and wherein accuracy and sensitivity are of paramount importance and cost a secondary item.

It will be recalled heretofore that the sensitivity of the corner flexure support means can be adjusted by physically removing material from the second and third flexure webs mounting the strain gauges as by means of the file 33 illustrated in FIG. 2. This feature constitutes an important consideration in that after an actual scale unit has been completed, there is very little likelihood that all of the corner flexure support means will have identical sensitivities. Such differences can be caused by physical differences in the actual strain gauges used, tolerances permitted in the actual machining of the flexure webs, and so forth.

However, once the entire unit is completed with the strain gauges in place, final sensitivity corrections can be made to exactly equalize the sensitivities of the four corner support flexure means.

More particularly, and with reference once again to FIG. 1, there is shown an X—X', Y—Y' and Z—Z' coordinate system with the origin at the precise geometrical center of the cover 10 which corresponds with the exact center of the load plate 11. Also shown is an off-center force F applied to the cover 10.

In adjusting the sensitivities after the unit has been completed, the cover 10 is removed and a given known standard force F applied exactly at the center of the origin in the direction of the vertical or Z—Z' axis. Each of the four corner posts of the corner support flexure means shown in FIG. 2 at 21, 22, 23 and 24 will support exactly one fourth of the force F so long as the force F is applied exactly on center. Since the output reading at the indicating means 18 in FIG. 1 constitutes an average of the output signal from each of the four corners, the span of the indicating scale is adjusted to provide a reading corresponding to the actual value of the force F.

If now the force F is moved off from the origin of the coordinate system to a position exactly over one corner, the output reading on the scale 18 should be the same as when the force F is centered provided that the sensitivities of all four corners are the same. However, assume that the actual output reading is different. This reading is recorded and then the force F is placed over another one of the corners and the reading again noted. The procedure is repeated for each of the remaining two corners. Those corner portions indicating low sensitivities are then treated by means of the file 23 described in FIG. 2 to increase their sensitivities to correspond to that corner indicating the highest reading. The span of the indicating scale can then be adjusted to correspond to the actual value of the applied force.

As a specific example, assume that the force F is 25 pounds. When this force is applied directly to the center of the load plate, the indicator span is adjusted to read 25 pounds. If the force is now applied over the corner a, assume that the reading is 23 pounds. When a force is applied on the corner b, assume the reading is 26 pounds whereas when applied over the corner c the reading is 24 pounds and when applied over the corner d the reading is 27 pounds. The average of all of these readings is 25 pounds corresponding to the actual value of the force but it is clear that the gauges a, b and c are less sensitive than the gauge d.

To equalize the sensitivities, it is only necessary to again place the 25 pounds weight over the corner a and file or remove material from the flexure webs supporting the strain gauges to increase the sensitivity from 23 to read 27; that is, the sensitivity is brought up to the highest output reading for the four corners.

Next the weight is transferred to the corner b and the reading of 26 is modified to read 27 by removing an appropriate lesser amount of material. The same procedure is repeated for the corner c having a reading of 24, material being removed until this reading corresponds to the 27 value for the corner d.

The sensitivities of all of the corners are thus exactly equalized. It is now only necessary to change the span of the indicator so that the proper reading will reflect 25 pounds rather than 27.

It can be appreciated that the circular cut-out configuration defining the lower and upper surfaces of the second and third horizontal flexure webs in each of the corner flexure support means results in a geometry which is readily accessible for material removal of the strain gauge supporting webs by the file and thus it is really a simple matter to assure equalization of the corner sensitivities. The cut-outs themselves are shown as circular since they can most easily be formed by a simple drilling operation. However, the cut-outs need not be circular but can be milled out to non-circular configurations so long as the cut-out is symmetrical about the mid axis 38 in FIGS. 5 and 6 and results in the increasing cross sectional areas with increasing value of x.

From all of the foregoing, it will thus be evident that the present invention has provided an improved weighing scale wherein consistent readings will be provided even though a weight placed thereon may be in an off center position and further wherein the flexure support design has been simplified as compared to prior art systems.

The preferred embodiment of the invention would be used as a weighing scale in post offices or in marketplaces, the range of weights varying from zero up to 70 pounds.

I claim:

1. A strain gauge flexure isolated weighing scale including an integral load member having an end portion for receiving a load and a central body portion secured in a stationary position with a flexure support means integrally connecting said central body portion to said end portion, said flexure support means including:

(a) first, second, third and fourth horizontal flexure webs disposed one below the other in vertically spaced relationship having first ends integrally secured to said central body portion and second ends extending towards said end portion, said end portion including first and second coplanar vertical flexure webs, said first vertical flexure web being connected between the extending second ends of said first and second horizontal flexure webs and said second vertical flexure web being connected between the extending second ends of said third and fourth horizontal flexure webs; and, (b) strain gauge means secured to at least one surface of at least one of said second and third horizontal flexure webs respectively.

2. A scale according to claim 1, in which the vertical spacing between said second and third horizontal flexure webs is defined by a cut-out in the load member; and in which said strain gauge means includes a tension strain gauge positioned on the upper surface of said second web between its mid point and its said first end and a compression strain gauge on the lower surface of said third flexure web between its mid point and its said first end, the cross sectional areas of said second and third horizontal flexure webs increasing with increasing distance from their mid points towards their opposite ends as a consequence of said cut-out so that the strain detected by each strain gauge is substantially constant over the length of the web surface covered by the strain gauge.

3. A strain gauge flexure isolated weighing scale including, in combination:

(a) a horizontal load plate;

(b) a horizontal base plate disposed beneath said load plate in spaced parallel relationship;

(c) first and second generally rectangular load members having central body portions lying in spaced vertical planes extending between said load plate and base plate, opposite end portions of each rectangular load member being symmetrical about a vertical axis passing midway through said central body portion and defining corner flexure support means having corner posts connected to the vertically opposed corners of said load plate, the bottoms of said central body portions of said rectangular members between their opposite corner flexure support means resting on said base plate, each of said corner flexure support means including first, second, third and fourth horizontal flexure webs disposed one below the other in vertically spaced relationship having first ends integrally secured to said central body portion and second ends extending towards the adjacent corner post, said adjacent corner post including vertical flexure web means having upper and lower opposite ends connected between at least two of the extending second ends of said horizontal flexure webs; and, (d) strain gauge means secured to at least one surface of at least one of said second and third horizontal flexure webs in each corner flexure support means and responsive to strains developed therein resulting from an applied force on said load plate to cause vertical downward movement of said load plate towards said base plate to provide electrical signals constituting a function of said force, said first and fourth horizontal flexure webs constraining movements of said corner post relative to said central body portion to a vertical rectilinear direction to isolate extraneous shear forces from said second and third horizontal flexure webs and said vertical flexure web means isolating bending moments between the remaining portion of said corner post and the central body portion of the rectangular member whereby said strain gauge means are responsive only to total vertical axial loading on said corner post by said applied force.

4. A scale according to claim 3, in which said vertical flexure web means includes first and second coplanar vertical flexure webs, said first vertical flexure web being connected between the extending second ends of said first and second horizontal flexure webs and said second vertical flexure web being connected between the extending second ends of said third and fourth horizontal flexure webs.

5. A scale according to claim 3, including stop means at opposite corners of the first and second rectangular load members, each stop means comprising a frictionally and eccentrically mounted roller defining between the bottom periphery of the roller and said base plate a stop clearance which may be adjusted by rotating said roller to different positions.

6. A scale according to claim 3, in which the vertical spacing between said first and second horizontal flexure webs in each corner flexure support means is defined by a cut-out in the rectangular member whereby a semi-cylindrical file can be manually inserted in the cut-out and the lower and/or upper surface of the second and third horizontal flexure webs respectively filed to change their cross sectional areas and thereby adjust the sensitivity enabling equalization of the signals from each corner of the load plate when an identical load is positioned over each corner.

7. A scale according to claim 3, in which said strain gauge means includes:

(a) a tension strain gauge positioned on the upper surface of said second flexure web between its mid point and its said first end; and (b) a compression strain gauge positioned on the upper surface of said second flexure web between its mid point and its said second end.

8. A scale according to claim 7, including a source of electrical energy and a signal indicating means; and two bridge circuits having two of their diagonally opposite vertices connected in parallel with said source and their other two diagonally opposite vertices connected in parallel with said signal indicating means, each of said two bridge circuits being associated with the strain gauges in the corner flexure support means at the opposite ends of said two rectangular members respectively, one bridge having the tension strain gauges at the opposite corner flexure support means for one rectangular member in opposite arms and the compression strain gauges at said corner flexure support means in the other opposite arms, and the other bridge circuit having the tension strain gauges at the corner flexure support means for the other rectangular member in opposite arms and the compression strain gauges for said corner flexure support means in the other opposite arms.

9. A scale according to claim 3, in which said strain gauge means includes:
   (a) a tension strain gauge positioned on the upper surface of said second flexure web between its mid point and its said first end in one corner of one of said rectangular members;
   (b) a compression strain gauge positioned on the lower surface of the third flexure web between its mid point and its said second end in the opposite corner of said one rectangular member;
   (c) a tension strain gauge positioned on the upper surface of said second flexure web between its mid point and its said first end in one corner of the other of said rectangular members; and
   (d) a compression strain gauge positioned on the lower surface of the third flexure web between its mid point and its said second end in the opposite corner of said other rectangular member.

10. A scale according to claim 9, including a source of electrical energy and a single indicating means; and a single bridge circuit having two of its diagonally opposite vertices connected to said source and its other two diagonally opposite vertices connected to said signal indicating means, two opposite arms of said bridge having said tension gauges and the other opposite arms having said compression gauges respectively so that a total of four strain gauges are provided in the four arms of the bridge, one in each arm providing a signal associated with one corner flexure support means.

11. A scale according to claim 3, in which said strain gauge means for each of said corner flexure support means includes:
   (a) a first tension strain gauge positioned on the upper surface of said second flexure web between its mid-point and its said first end;
   (b) a first compression strain gauge positioned on the upper surface of said second flexure web between its midpoint and its said second end;
   (c) a second tension strain gauge positioned on the lower surface of said third flexure web between its mid point and its said first end; and
   (d) a second compression strain gauge positioned on the lower surface of said third flexure web between its midpoint and its said second end.

12. A scale according to claim 11, in which the cross sectional areas of said second and third horizontal flexure webs increase with increasing distance from the midpoints of the webs towards their ends so that the strain detected by each strain gauge is substantially constant over the length of the web surface covered by the strain gauge.

13. A scale according to claim 11, including a source of electrical energy and a signal indicating means; and four bridge circuits having two of their diagonally opposite vertices connected in parallel with said source and their other two diagonally opposite vertices connected in parallel with said signal indicating means, each of the four bridge circuits being associated with the strain gauges in each of the four corner flexure support means, respectively, the first and second tension strain gauges being incorporated in opposite arms of a corresponding bridge and the first and second compression strain gauges being incorporated in the other opposite arms of said bridge.

14. A scale according to claim 3, in which said strain gauge means includes:
   (a) a tension strain gauge positioned on the upper surface of said second flexure web between its mid point and its said first end; and
   (b) a compression strain gauge positioned on the lower surface of said third flexure web between its mid point and its said first end.

15. A scale according to claim 14, including a source of electrical energy and a signal indicating means; and two bridge circuits having two of their diagonally opposite vertices connected in parallel with said source and their other two diagonally opposite vertices connected in parallel with said signal indicating means, each of said two bridge circuits being associated with the strain gauges in the corner flexure support means at the opposite ends of said two rectangular members respectively, one bridge having the tension strain gauges at the opposite corner flexure support means for one rectangular member in opposite arms and the compression strain gauges at said corner flexure support means in the other opposite arms, and the other bridge circuit having the tension strain gauges at the corner flexure support means for the other rectangular member in opposite arms and the compression strain gauges for said corner flexure support means in the other opposite arms.

16. A scale according to claim 14, including a source of electrical energy and a signal indicating means; and a single bridge circuit having two of its diagonally opposite vertices connected to said source and its other two diagonally opposite vertices connected to said signal indicating means, each of two opposite arms of said bridge having two tension gauges in series associated with two of the four corner flexure support means of said rectangular members and each arm of the other opposite arms of said bridge having two compression strain gauges in series associated with the four corner flexure support means of said two rectangular members.

* * * * *